United States Patent Office 3,590,042
Patented June 29, 1971

1

3,590,042
N-s-TRIAZYL IMIDES OF HALO SUBSTITUTED POLYHYDROPOLYCYCLICDICARBOXYLIC ACIDS
Henry A. Cyba, Evanston, Ill., assignor to Universal Oil Products Company, Des Plaines, Ill.
No Drawing. Filed Sept. 5, 1968, Ser. No. 757,777
Int. Cl. C07d 55/22
U.S. Cl. 260—249.6     8 Claims

ABSTRACT OF THE DISCLOSURE

Novel compositions of matter comprising N-s-triazyl imides of halo-substituted polyhydropolycyclicdicarboxylic acids as exemplified by 2-N-(5,6,7,8,9,9-hexachloro-1,2,3,4,4a,5,8,8a-octahydro-5,8-methano - 2,3 - naphthalenedicarboximido)-4,6-diamino-s-triazine are useful as additives for plastics, polymers, resins, etc. whereby flameproof or fire-retardant properties are added thereto.

---

This invention relates to novel compositions of matter comprising N-s-triazyl imides of halo-substituted polyhydropolycyclicdicarboxylic acids. More specifically, the invention relates to these compositions of matter and to the use thereof as additives to polymers or other chemical compounds whereby certain desirable physical characteristics are imparted to these compounds.

It has now been discovered that novel compositions of matter comprising, as hereinbefore set forth, N-s-triazyl imides of halo-substituted polyhydropolycyclicdicarboxylic acids may be prepared by reacting a triazine compound containing at least one amino substituent with a halo-substituted polyhydropolycyclicdicarboxylic acid or anhydride thereof within certain mole ratios to prepare the desired products. For purposes of this invention, the term "N-s-triazyl imides of halo-substituted polyhydropolycyclicdicarboxylic acids," as used in the present specification and appended claims, will refer to both mono-, bis-, and tris-imides. Also, the term "halo-substituted" will refer to mono- and polyhalo-substituted compounds. These novel compositions of matter will, as hereinbefore set forth, be useful as additives to plastics, polymers, co-polymers, terpolymers, resins, elastomers, rubbers, textiles and fibers, both naturally occurring and synthetic in nature, such as cotton, wool, Dacron, nylon, rayon, etc., coatings, paints, varnishes, leather, foams, cellulose acetate butyrate, ethyl cellulose, cellulose propionate, etc., polyolefins such as polyethylene and polyethylene copolymers, polypropylene and polypropylene co-polymers, polystyrenes, polystyrene co-polymers, polyvinyl acetate, or alcohol and co-polymers, polyesters, polyurethane, polyphenyl ethers, polycarbonates, polyamides, polyoxymethylenes, polyalkylene oxides, such as polyethylene oxide, polyacrylates and co-polymers, polymethacrylates and co-polymers with styrene, butadiene, acrylonitrile, etc., epoxy resins, acrylonitrile-butadiene-styrene formulations (commonly known as ABS), polybutylene and acrylic ester modified styrene-acrylonitrile (ASA), methylmethacrylate - styrene - butadiene terpolymer, etc. whereby the desirable physical characteristics of flameproofing or fire retardancy will be imparted to the aforementioned materials. This property will

2 possess special advantages when preparing plastic or resinous material which will be utilized in places which may be subjected to excessive heat or possible flame such as architectural panels for construction work, such as building panels, skydomes, flashings, wall plugs for electrical connections, ash trays, etc. In addition, the compound when used as a constituent of paint, lacquer, varnishes, or protective coatings, films, etc. will also impart a fire resistancy to these compounds, and, therefore, render them commercially attractive as articles of commerce. Furthermore, the flame retardancy of foams such as the polyurethane foams will greatly enhance their use as insulating material or soundproofing material. Also, besides imparting the desirable physical characteristics of flame retardancy to the various articles of manufacture, the additives will render clear plastics or resins more stable to color changes and, therefore, will be an important component of these compounds whenever it is desirable that discoloration of the finished product is to be avoided or will tend to render such articles unuseable. It is also contemplated that the novel compositions of matter of this invention may also be used as an insecticide or as an ingredient in insecticidal formulations.

It is therefore an object of this invention to provide novel compositions of matter which possess desirable physical properties.

Another object of this invention is to provide novel compositions of matter possessing the desirable physical characteristics of flameproofing and fire retardancy which may be used as additives in other chemical formulations.

In one aspect an embodiment of this invention resides in a novel compound comprising an N-s-triazyl imide of a halo-substituted polyhydropolycyclicdicarboxylic acid.

Another embodiment of this invention resides in a composition of matter comprising a polymeric compound containing at least one reactive substituent and an N-s-triazyl imide of a halo-substituted polyhydropolycyclicdicarboxylic acid.

A specific embodiment of this invention is found in 2-N-(5,6,7,8,9,9-hexachloro - 1,2,3,4,4a,5,8,8a-octahydro-5,8-methano - 2,3 - naphthalenedicarboximido) - 4,6 - di-amino-s-triazine.

Another specific embodiment of this invention is found in a polymeric compound which comprises polyphenylene oxide and 2-N-(5,6,7,8,9,9-hexachloro-1,2,3,4,4a,5,8,8a-octahydro-5,8-methano - 2,3-naphthalenedicarboximido)-4,6-diamino-s-triazine.

Other objects and embodiments will be found in the following further detailed description of the present invention.

As hereinbefore set forth, the present invention is concerned with novel compositions of matter comprising N-s-triazyl imides of halo-substituted polyhydropolycyclicdicarboxylic acids. In one embodiment, these compounds are prepared by condensing a halo-substituted polyhydropolycyclicdicarboxylic acid or anhydride thereof with a triazine compound of the type hereinafter set forth in greater detail, the details of the condensation being set forth in a more specific manner in a later portion of the present specification. Any suitable polyhalo-substituted polyhydropolycyclicdicarboxylic acid or anhydride thereof may be used in the preparation of the desired composition of matter, said polyhalo-substituted polyhydropolycyclicdicarboxylic acid or anhydride thereof being illustrated by the following general formulas:

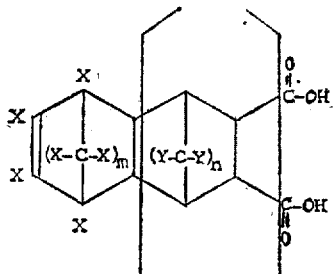

and

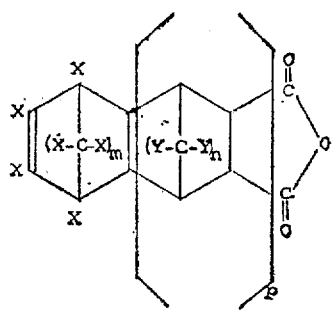

in which X is selected from the group consisting of halogen and particularly chlorine and/or bromine, and hydrogen radicals, at least two of the X's being halogen, Y is also selected from the group consisting of halogen and hydrogen radicals, $m$ is an integer of from one to two, $n$ ranges from zero to two and $p$ ranges from zero to one. Representative examples of the polyhalopolyhydropolycyclicdicarboxylic acids or anhydrides thereof which may be utilized include 1,4,5,6,7,7-hexachlorobicyclo-[2.2.1]-5-heptene-2,3-dicarboxylic acid or the anhydride thereof which may be prepared by condensing maleic acid or maleic anhydride with hexachlorocyclopentadiene. Another example of the acid or anhydride phich may be used comprises 5,6,7,8,9,9-hexachloro-1,2,3,4,4a,5,8,8a - octahydro-5,8-methano - 2,3 - naphthalenedicarboxylic acid which is prepared by condensing a conjugated aliphatic diene such as 1,3-butadiene with maleic acid and thereafter further condensing the resultant cyclohexenedicarboxylic acid, which is 1,2,3,6-tetrahydrophthalic acid, with a halocycloalkadiene such as hexachlorocyclopentadiene to form the desired product. It is to be understood that the corresponding anhydride may be prepared by utilizing maleic anhydride as one of the starting materials in place of maleic acid. Yet another example of polyhalopolyhydropolycyclicdicarboxylic acid or anhydride which may be used is one which is prepared by condensing cyclopentadiene with maleic acid or maleic anhydride to form norborn-5-ene-2,3-dicarboxylic acid or anyhydride and thereafter condensing this product with hexachorocyclopentadiene to form 5,6,7,8,9,9-hexachloro-1,2,3,4,4a,5, 8,8a-octahydro-1,4,5,8-dimethano - 2,3 - naphthalene-dicarboxylic acid or anhydride. It is to be understood that other starting materials may also be utilized to form similar acids or anhydrides. Illustrative examples of these starting materials include other acids such as fumaric acid, itaconic acid, citraconic acid, glutaconic acid, etc.; conjugated aliphatic dienes including 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene; conjugated octadienes, nonadienes, etc.; other suitable halo-substituted cycloalkadienes which may be used include 1,2 - dichlorocyclopentadiene, 1,2,3 - trichlorocyclopentadiene, 1,2,3,4-tetrachlorocyclopentadiene, 1,2,3,4,5-pentachlorocyclopentadiene and similar compounds in which all or part of the chlorine is replaced by other halogen atoms and particularly bromine.

As hereinafter set forth, the aforementioned halo-substituted polyhydropolycyclicdicarboxylic acids or anhydrides thereof are condensed with a triazine compound possessing the generic formula:

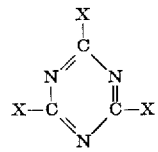

in which X is selected from the group consisting of amino, halogen (preferably chlorine or bromine), alkyl, cycloalkyl, aryl, alkylene, aralkyl, alkaryl, alkoxy, aryloxy, haloaryl and substituted amino radicals containing one of the aforementioned radicals, at least one X being amino. Some representative illustrative examples of these triazines which may be used will include 2-amino-4,6-dichloro-s-triazine,
2-amino-4,6-dibromo-s-triazine,
2-amino-4,6-dimethyl-s-triazine,
2-amino-4,6-diethyl-s-triazine,
2-amino-4,6-dipropyl-s-triazine,
2-amino-4,6-dicyclopentyl-s-triazine,
2-amino-4,6-dicyclohexyl-s-triazine,
2-amino-4,6-divinyl-s-triazine,
2-amino-4,6-diallyl-s-triazine,
2-amino-4,6-diphenyl-s-triazine,
2-amino-4,6-dibenzyl-s-triazine,
2-amino-4,6-di-(o-tolyl)-s-triazine,
2-amino-4,6-di-(m-tolyl)-s-triazine,
2-amino-4,6-di-(p-tolyl)-s-triazine,
2-amino-4,6-di-(p-ethylphenyl)-s-triazine,
2-amino-4,6-dimethoxy-s-triazine,
2-amino-4,6-diethoxy-s-triazine,
2-amino-4,6-dipropoxy-s-triazine,
2-amino-4,6-diphenoxy-s-triazine,
2-amino-4,6-di-(o-chlorophenyl)-s-triazine,
2-amino-4,6-di-(m-chlorophenyl)-s-triazine,
2-amino-4,6-di-(p-chlorophenyl)-s-triazine,
2-amino-4,6-di-(o-bromophenyl)-s-triazine,
2-amino-4,6-di-(m-bromophenyl)-s-triazine,
2-amino-4,6-di-(p-bromophenyl)-s-triazine;
2,4-diamino-6-chloro-s-triazine,
2,4-diamino-6-methyl-s-triazine,
2,4-diamino-6-propyl-s-triazine,
2,4-diamino-6-hexyl-s-triazine,
2,4-diamino-6-allyl-s-triazine,
2,4-diamino-6-benzyl-s-triazine,
2,4-diamino-6-m-tolyl-s-triazine,
2,4-diamino-6-p-ethylphenyl-s-triazine,
2,4-diamino-6-ethoxy-s-triazine,
2,4-diamino-6-phenoxy-s-triazine,
2,4-diamino-6-m-chlorophenyl-s-triazine,
2,4-diamino-6-o-bromophenyl-s-triazine,
2,4-diamino-6-p-bromophenyl-s-triazine;
2,6-diamino-4-bromo-s-triazine,
2,6-diamino-4-ethyl-s-triazine,
2,6-diamino-4-cyclopentyl-s-triazine,
2,6-diamino-4-vinyl-s-triazine,
2,6-diamino-4-phenyl-s-triazine,
2,6-diamino-4-o-tolyl-s-triazine,
2,6-diamino-4-p-tolyl-s-triazine,
2,6-diamino-4-methoxy-s-triazine,
2,6-diamino-4-propoxy-s-triazine,
2,6-diamino-4-o-chlorophenyl-s-triazine,
2,6-diamino-4-p-chlorophenyl-s-triazine,
2,6-diamino-4-m-bromophenyl-s-triazine;
2,4,6-triamino-s-triazine (melamine);
2-amino-4,6-di-(methyl-amino)-s-triazine,
2-amino-4,6-di-(ethylamino)-s-triazine, 2-amino-4,6-di(2-hydroxyethylamino)-s-triazine,
2-amino-4,6-di-(3-hydroxypropylamino)-s-triazine,
2-amino-4,6-di-(vinylamino)-s-triazine,
2-amino-4,6-di-(allylamino)-s-triazine,
2-amino-4,6-di-(phenylamino)-s-triazine,
2-amino-4,6-di-(benzylamino)-s-triazine,
2-amino-4,6-di-(p-tolylamino)-s-triazine,
2-amino-4,6-di-(chloroamino)-s-triazine,
2-amino-4,6-di-(bromoamino)-s-triazine,
2-amino-4,6-di-(methoxyamino)-s-triazine,
2-amino-4,6-di-(ethoxyamino)-s-triazine,
2-amino-4,6-di-(phenoxyamino)-s-triazine,
2-amino-4,6-di-(p-chlorophenylamino)-s-triazine,
2-amino-4,6-di(o-bromophenylamino)-s-triazine;
2,4-diamino-6-methylamino-s-triazine,
2,4-diamino-6-ethylamino-s-triazine,
2,4-diamino-6-vinylamino-s-triazine,
2,4-diamino-6-allylamino-s-triazine,
2,4-diamino-6-methoxyphenylamino-s-triazine,
2,4-diamino-6-ethoxyphenylamino-s-triazine,
2,4-diamino-6-methoxyamino-s-triazine,
2,4-diamino-6-benzylamino-s-triazine;
2-amino-4,6-di-(divinylamino)-s-triazine,
2-amino-4,6-di(diallylamino)-s-triazine,
2-amino-4,6-di-dianilinoamino)-s-triazine,
2-amino-4,6-di-(ditolylamino)-s-triazine,
2-amino-4,6-di-(dichloroamino)-s-triazine,
2-amino-4,6-di-(dibenzylamino)-s-triazine,
2-amino-4,6-di-(dimethoxyamino)-s-triazine,
2-amino-4,6-di-(diethoxyamino)-s-triazine,
2-amino-4,6-di-(di-p-methoxyphenylamino)-s-triazine,
2-amino-4,6-di-(di-p-ethoxyphenylamino)-s-triazine,
2-amino-4,6-di-(p-chlorophenylamino)-s-triazine, etc.

It is to be understood that the aforementioned triazines are only representative of the class of compounds which may be condensed with the aforementioned halo-substituted polyhydropolycyclicdicarboxylic acids or anhydrides thereof, and that the present invention is not necessarily limited thereto.

As hereinbefore set forth, the novel compositions of matter of the present invention are prepared by condensing a halo-substituted polyhydropolycyclicdicarboxylic acid or anhydride thereof of the type hereinbefore set forth in greater detail with a triazine compound at condensation conditions which include a temperature in the range of from about ambient (about 25° C.) up to about 250° C. or more and at a pressure which may range from atmospheric up to about 150 atmospheres or more. The preferred condensation conditions are those within the lower range hereinbefore set forth, that is, ambient temperature and atmospheric pressure. However, if elevated temperatures in the upper limit of the range previously mentioned are employed, it is contemplated that the reaction will be effected at superatmospheric pressures. These superatmospheric pressures are generated by the introduction of a substantially inert gas such as nitrogen into the reaction zone, said pressure which is used being that which is sufficient to maintain a major portion of the reactants in the liquid phase. Generally speaking, the reaction or condensation may also be effected in the presence of a substantially inert organic solvent. When utilizing a solvent, the temperature which is employed will usually be the reflux temperature of the solvent. Specific examples of the type of solvents which may be employed will include aromatic hydrocarbons such as toluene, o-xylene, m-xylene, p-xylene, ethylbenzene, etc.; aliphatic and cycloaliphatic paraffins such as n-heptane, methylcyclopentane, cyclohexane, etc.; alcohols such as methyl alcohol, ethyl alcohol, n-propyl alcohol, isopropyl alcohol, n-butyl alcohol, etc.; ethers such as dimethyl ether, diethyl ether, dipropyl ether, etc.; dioxane, various esters, chlorinated hydrocarbons, etc. The residence time during which the condensation is effected will be of a duration which is sufficient to effect a substantially complete reaction and may vary in time from about 0.5 up to about 10 hours or more, the reaction being substantially complete when the theoretical amount of water which has been formed during the condensation has been recovered. In addition, the mole ratio of halo-substituted polyhydropolycyclicdicarboxylic acid or anhydride thereof to the triazine compound will vary over a wide range depending upon the particular compound which is to be the desired product. Therefore, the mole ratio may range from 1.1 up to about 5.1 moles of halo-substituted polyhydropolycyclicdicarboxylic acid or anhydride thereof per mole of triazine compound. For example, when the desired product will comprise a monoimide of the triazine compound, the reactants will comprise a mono-amino substituted triazine compound and the acid or anhydride, said reactants being present in a 1:1 molar ratio. Likewise, when the desired product will comprise a bis-N,N'-s-triazyl imide of the acid, a diamino triazine compound will be used and the acid or anhydride will be present in a molar excess ranging from at least 2:1 up to about 5:1 moles of acid or anhydride per mole of triazine compound. When a tris-N,N',N''-s-triazyl imide of a halo-substituted polyhydro-polycyclicdicarboxylic acid is desired, the reactants will comprise melamine and the particular acid or anhydride, said acid or anhydride being present in a molar excess ranging from at least 3:1 up to about 5:1 moles of acid or anhydride per mole of melamine.

The process of the present invention may be effected in any suitable manner and may comprise either a batch or continuous type operation. For example, when a batch type operation is used a quantity of the particular acid or anhydride and triazine compound is placed in an appropriate apparatus along with a particular solvent, if one is desired. The apparatus, which may comprise a condensation flask, is provided with heating and stirring means as well as a water trap whereby the water of reaction which is formed may be withdrawn. The flask is then heated to the desired operating temperature, which if a solvent is used, is the reflux temperature thereof, and allowed to proceed for a predetermined resident time. This time is calculated as when the theoretical amount of water has been removed. Following this the flask and contents thereof are allowed to cool to room temperature and the reaction product is recovered. The product is then separated from any solvent by conventional means as evaporation, suction, filtration, etc., and recovered. In the event that superatmospheric temperatures and pressures are to be used, the reactor which is employed for the batch type operation may comprise a rotating or stirred autoclave whereby the desired pressure may be attained by charging nitrogen to the reactor prior to heating to the desired operating temperature.

It is also contemplated within the scope of this invention that the continuous manner of operation may be employed. When such a type of operation is used the starting material comprising the acid or anhydride of the type hereinbefore set forth in greater detail and the diamino compound are continuously charged to the reactor which is maintained in the proper operating conditions of temperature and pressure. In the event that a solvent is to be employed, one or both of the reactants may be dissolved in the solvent prior to entry into said reactor. Alternatively speaking, the solvent may be charged to the reactor in a separate stream if so desired. Upon completion of the desired residence time, the reaction effluent is continuously withdrawn. The reaction product is separated from the water of reaction which is formed in the solvent by conventional means. In addition, the reaction product is also separated from any unreacted starting material which may still be present in the reactor, the latter being recycled to form a portion of the feed stock. The desired N-s-triazyl imides of the halo-substituted polyhydropolycyclicdicarboxylic acids are recovered.

While the aforementioned method for preparing the novel compositions of matter of the present invention have illustrated the condensation of a halo-substituted polyhydropolycyclicdicarboxylic acid or anhydride with a triazine compound containing at least one amino substituent, it is also contemplated within the scope of this invention that other processes for preparing the desired products may also be utilized. For example, the triazine compound containing at least one amino substituent may also be reacted with an unsaturated dibasic acid or anhydride, thereafter adding a diolefinic hydrocarbon to the resultant imide followed by further addition with a halogenated diene. For example, maleic acid or maleic anhydride may be condensed with the triazine then with the 1,3-butadiene followed by the further addition of hexachlorocyclopentadiene to form the novel compositions of matter such as 2-N-(5,6,7,8,9,9-hexachloro - 1,2,3,4,4a,5,8,8a-octahydro-5,8-methano - 2,3 - naphthalenedicarboximido) - 4,6-diamino-s-triazine.

Examples of the novel compositions of matter of the present invention comprise N-s-triazyl imides of halo-substituted polyhydropolycyclicdicarboxylic acids. Some representative illustrative examples of these compounds will include 2-N-(5,6,7,8,9,9-hexachloro-1,2,3,4,4a,5,8,8a-octahydro-5,8-methano-2,3-naphthalenedicarboximido)-4,6-dichloro-s-triazine;
2-N-(5,6,7,8,9,9-hexachloro-1,2,3,4,4a,5,8,8a-octahydro-1,4,5,8-dimethano-2,3-naphthalenedicarboximido)-4,6-dichloro-s-triazine;
2-N-(1,4,5,6,7,7-hexachlorobicyclo-[2.2.1]-5-heptene-2,3-dicarboximido)-4,6-dichloro-s-triazine;
2-N-(5,6,7,8,9,9-hexabromo-1,2,3,4,4a,5,8,8a-octahydro-5,8-methano-2,3-naphthalenedicarboximido)-4,6-dichloro-s-triazine;
2-N-(5,6,7,8,9,9-hexabromo-1,2,3,4,4a,5,8,8a-octahydro-1,4,5,8-dimethano-2,3-naphthalenedicarboximido)-4,6-dichloro-s-triazine;
2-N-(1,4,5,6,7,7-hexabromobicyclo-[2.2.1]-5-heptene-2,3-dicarboximido)-4,6-dichloro-s-triazine;
2-N-(5,6,7,8,9,9-hexachloro-1,2,3,4,4a,5,8,8a-octahydro-5,8-methano-2,3-naphthalenedicarboximido)-4,6-dimethyl-s-triazine;
2-N-(5,6,7,8,9,9-hexachloro-1,2,3,4,4a,5,8,8a-octahydro-1,4,5,8-dimethano-2,3-naphthalenedicarboximido)-4,6-dimethyl-s-triazine;
2-N-(1,4,5,6,7,7-hexachlorobicyclo-[2.2.1]-5-heptene-2,3-dicarboximido)-4,6-dimethyl-s-triazine;
2-N-(5,6,7,8,9,9-hexachloro-1,2,3,4,4a,5,8,8a-octahydro-5,8-methano-2,3-naphthalenedicarboximido)-4,6-dicyclopentyl-s-triazine;
2-N-(5,6,7,8,9,9-hexachloro-1,2,3,4,4a,5,8,8a-octahydro-1,4,5,8-dimethano-2,3-naphthalenedicarboximido)-4,6-dicyclopentyl-s-triazine;
2-N-(1,4,5,6,7,7-hexachlorobicyclo-[2.2.1]-5-heptene-2,3-dicarboximido)-4,6-dicyclopentyl-s-triazine;
2-N-(5,6,7,8,9,9-hexachloro-1,2,3,4,4a,5,8,8a-octahydro-5,8-methano-2,3-naphthalenedicarboximido)-4,6-diphenyl-s-triazine;
2-N-(5,6,7,8,9,9-hexachloro-1,2,3,4,4a,5,8,8a-octahydro-1,4,5,8-dimethano-2,3-naphthalenedicarboximido)-4,6-diphenyl-s-triazine;
2-N-(1,4,5,6,7,7-hexachlorobicyclo-[2.2.1]-5-heptene-2,3-dicarboximido)-4,6-diphenyl-s-triazine;
2-N-(5,6,7,8,9,9-hexachloro-1,2,3,4,4a,5,8,8a-octahydro-5,8-methano-2,3-naphthalenedicarboximido)-4,6-dimethoxy-s-triazine;
2-N-(5,6,7,8,9,9-hexachloro-1,2,3,4,4a,5,8,8a-octahydro-1,4,5,8-dimethano-2,3-naphthalenedicarboximido)-4,6-dimethoxy-s-triazine;
2-N-(1,4,5,6,7,7-hexachlorobicyclo-[2.2.1]-5-heptene-2,3-dicarboximido)-4,6-dimethoxy-s-triazine;
2-N-(5,6,7,8,9,9-hexachloro-1,2,3,4,4a,5,8,8a-octahydro-5,8-methano-2,3-naphthalenedicarboximido)-4,6-di-(p-bromophenyl)-s-triazine;
2-N-(5,6,7,8,9,9-hexachloro-1,2,3,4,4a,5,8,8a-octahydro-1,4,5,8-dimethano-2,3-naphthalenedicarboximido)-4,6-di-(p-bromophenyl)-s-triazine;
2-N-(1,4,5,6,7,7-hexachlorobicyclo-[2.2.1]-5-heptene-2,3-dicarboximido)-4,6-di-(p-bromophenyl)-s-triazine;
2,4-bis-[N-(5,6,7,8,9,9-hexachloro-1,2,3,4,4a,5,8,8a-octahydro-5,8-methano-2,3-naphthalenedicarboximido)]-6-ethyl-s-triazine;
2,4-bis-[N-(5,6,7,8,9,9-hexachloro-1,2,3,4,4a,5,8,8a-octahydro-1,4,5,8-dimethano-2,3-naphthalenedicarboximido)]-6-ethyl-s-triazine;
2,4-bis-[N-(1,4,5,6,7,7-hexachlorobicyclo-[2.2.1]-5-heptene-2,3-dicarboximido)]-6-ethyl-s-triazine;
2,4-bis-[N-(5,6,7,8,9,9-hexachloro-1,2,3,4,4a,5,8,8a-octahydro-5,8-methano-2,3-naphthalenedicarboximido)]-6-phenoxy-s-triazine;
2,4-bis-[N-(5,6,7,8,9,9-hexachloro-1,2,3,4,4a,5,8,8a-octahydro-1,4,5,8-dimethano-2,3-naphthalenedicarboximido)]-6-phenoxy-s-triazine;
2,4-bis-[N-(1,4,5,6,7,7-hexachlorobicyclo-[2.2.1]-5-heptene-2,3-dicarboximido)]-6-phenoxy-s-triazine;
2,6-bis-[N-(5,6,7,8,9,9-hexachloro-1,2,3,4,4a,5,8,8a-octahydro-5,8-methano-2,3-naphthalenedicarboximido)]-4-ethyl-s-triazine;
2,6-bis-[N-(5,6,7,8,9,9-hexachloro-1,2,3,4,4a,5,8,8a-octahydro-1,4,5,8-dimethano-2,3-naphthalenedicarboximido)]-4-ethyl-s-triazine;
2,6-bis-[N-(1,4,5,6,7,7-hexachlorobicyclo-[2.2.1]-5-heptene-2,3-dicarboximido)]-4-ethyl-s-triazine;
2,4-bis-[N-(5,6,7,8,9,9-hexachloro-1,2,3,4,4a,5,8,8a-octahydro-5,8-methano-2,3-naphthalenedicarboximido)]-6-diallylamino-s-triazine;
2,4-bis-[N-(5,6,7,8,9,9-hexachloro-1,2,3,4,4a,5,8,8a-octahydro-1,4,5,8-dimethano-2,3-naphthalenedicarboximido)]-6-diallylamino-s-triazine;
2,4-bis-[N-(1,4,5,6,7,7-hexachlorobicyclo-[2.2.1]-5-heptene-2,3-dicarboximido)]-6-diallylamino-s-triazine;
2,4,6-tris-[N-(5,6,7,8,9,9-hexachloro-1,2,3,4,4a,5,8,8a-octahydro-5,8-methano-2,3-naphthalenedicarboximido)]-s-triazine;
2,4,6-tris-[N-(5,6,7,8,9,9-hexachloro-1,2,3,4,4a,5,8,8a-octahydro-1,4,5,8-dimethano-2,3-naphthalenedicarboximido)]-s-triazine;
2,4,6-tris-[N-(1,4,5,6,7,7-hexachlorobicyclo-[2.2.1]-5-heptene-2,3-dicarboximido)]-s-triazine;
2,6-bis-[N-(5,6,7,8,9,9-hexabromo-1,2,3,4,4a,5,8,8a-octahydro-5,8-methano-2,3-naphthalenedicarboximido)]-4-ethyl-s-triazine;
2,6-bis-[N-(5,6,7,8,9,9-hexabromo-1,2,3,4,4a,5,8,8a-octahydro-1,4,5,8-dimethano-2,3-naphthalenedicarboximido)]-4-ethyl-s-triazine;
2,6-bis-[N-(1,4,5,6,7,7-hexabromobicyclo-[2.2.1]-5-heptene-2,3-dicarboximido)]-4-ethyl-s-triazine;
2,4-bis-[N-(5,6,7,8,9,9-hexabromo-1,2,3,4,4a,5,8,8a-octahydro-5,8-methano-2,3-naphthalenedicarboximido)]-6-diallylamino-s-triazine;
2,4-bis-[N-(5,6,7,8,9,9-hexabromo-1,2,3,4,4a,5,8,8a-octahydro-1,4,5,8-dimethano-2,3-naphthalenedicarboximido)]-6-diallylamino-s-triazine;
2,4-bis-[N-(1,4,5,6,7,7-hexabromobicyclo-[2.2.1]-5-heptene-2,3-dicarboximido)]-6-diallylamino-s-triazine;
2,4,6-tris-[N-(5,6,7,8,9,9-hexabromo-1,2,3,4,4a,5,8,8a-octahydro-5,8-methano-2,3-naphthalenedicarboximido)]-s-triazine;
2,4,6-tris-[N-(5,6,7,8,9,9-hexabromo-1,2,3,4,4a,5,8,8a-octahydro-1,4,5,8-dimethano-2,3-naphthalenedicarboximido)]-s-triazine;
2,4,6-tris-[N-(1,4,5,6,7,7-hexabromobicyclo-[2.2.1]-5-heptene-2,3-dicarboximide)]-s-triazine; etc.

While the above illustrative examples are all drawn to hexahalo-substituted compounds, it is to be understood that imides containing less than six halogen atoms such as the pentachloro-, pentabromo-, tetrachloro-, tetrabromo-, trichloro-, tribromo-, dichloro-, and dibromo-substituted compounds also fall within the scope of this invention and are correspondingly prepared by using a pentahalo-substituted, tetrahalo-substituted, trihalo-substituted, or dihalo-substituted dienic hydrocarbon as starting materials.

As hereinbefore set forth, the novel compositions of matter of the present invention may be utilized as additives for plastics, resins, polymers, co-polymers, textiles, naturally occurring products such as leather, wood, paints, coatings, etc. For example, the N-s-triazyl imides of the halo - substituted polyhydropolycyclicdicarboxylic acids may be used as additives with polymeric olefins such as polypropylene whereby the final product will possess advantageous physical properties such as an increased stability against deterioration, weathering, and aging which have been induced by chemical, physical, biological agents, or radiation. In addition, the polyolefins will have a higher ignition point as well as a high degree of flame retardancy. The imides may be added to polypropylene in a range of from about 5% to about 50% by weight of the polymeric material to be treated, thereafter it will be found that the oxygen index will have increased while the burning rate will be decreased. Examples of other polymeric products which may be treated with the N-s-triazyl imides of the halo - substituted polyhydropolycyclicdicarboxylic acids will include epoxy resins such as the condensation product of epichlorohydrin and Bisphenol-A. The epoxy resins in an uncured state will usually be thermal plastic and may range from low viscosity liquids to high melting point brittle solids. The resins may be cured by mixing an imide of the acid of the type hereinbefore set forth with a resin and thereafter curing the mixture by treatment at an elevated temperature for a predetermined period of time. The resultant product will have the physical characteristics thereof altered to their desirable values as pertains to color stability and flame retardancy and thus may be utilized for various purposes such as floor surfacings, coatings, etc. Other types of polymeric compounds which may be treated with the novel compositions of matter of the present invention will include polyphenylene oxides (polyphenyl ethers) which have been extended by treatment with styrene, polycarbonates, polyesters, polyurethane foams, phenolic resins, various elastomers, acetal resins, etc., co-polymers such as ABS, etc.

It is also contemplated within the scope of this invention that other conventional flame retardants including, but not limited to, phosphate esters, alkyl diaryl phosphates, cresol diphenyl phosphate, octyl diphenyl phosphate, triaryl phosphates, tributyl phosphate, triphenyl phosphate, phosphonate esters, antimony oxide, barium metaborate, zinc borate, boric acid, dibutyl tin maleate, etc. may be used in conjunction with the N-s-triazyl imides of halo-substituted polyhydropolycyclicdicarboxylic acids of the present invention.

The following examples are given to illustrate the process of the present invention which, however, are not intended to limit the generally broad scope of the present invention in strict accordance therewith.

EXAMPLE I

In this experiment 127 grams (1.0 mole) of 2,4,6-triamino-s-triazine (melamine), 425 grams (1.0 mole) of 5,6,7,8,9,9 - hexachloro - 1,2,3,4,4a,5,8,8a - octahydro-5,8 - methano - 2,3 - naphthalenedicarboxylic anhydride, 2 grams of acid resins, and 800 cc. of the dimethyl ether of diethylene glycol were placed in the glass liner of a rotating autoclave. The liner was sealed in the autoclave and heated at a temperature of 200° C. for a period of 6 hours. At the end of this time, heating was discontinued, the autoclave was allowed to return to room temperature, and the reaction product was recovered. The solid crystalline material was filtered from the mother liquor, dissolved in dimethyl formamide and recrystallized by the addition of water. The recrystallized material, comprising the 2 - N - (5,6,7,8,9,9 - hexachloro - 1,2,3,4,4a,5,8,8a- octahydro - 5,8 - methano - 2,3 - naphthalenedicarboximido) - 4,6 - diamino - s - triazine, had a melting point of 320° C.

Calculated for $C_{16}Cl_6H_{10}N_6O_2$ (percent): Cl, 40; N, 15.73. Found (percent): Cl, 39.5; N, 13.89.

EXAMPLE II

In this example 437 grams (1.0 mole) of 5,6,7,8,9,9-hexachloro - 1,2,3,4,4a,5,8,8a - octahydro - 1,4,5,8 - dimethano - 2,3 - naphthalenedicarboxylic anhydride along with 800 cc. of the dimethyl ether of diethylene glycol are placed in the glass liner of a rotating autoclave. In addition, 127 grams (1.0 mole) of melamine is also added to the glass liner which is thereafter heated to a temperature of about 200° C. and maintained thereat for a period of about 6 hours. At the end of this time, the heating is discontinued, the autoclave is allowed to return to room temperature and the reaction product is recovered. The solid crystalline material which forms during the reaction is filtered from the mother liquor and dissolved in dimethyl formamide. Following this, the solid material is recrystallized by adding water to the dimethyl formamide. After separation and drying, the desired product comprising 2 - N - (5,6,7,8,9,9 - hexachloro - 1,2,3,4,4a,5,8,8a - octahydro - 1,4,5,8 - dimethano-2,3 - naphthalenedicarboximido) - 4,5 - diamino - s - triazine is recovered.

EXAMPLE III

A mixture of 389 grams (1.0 mole) of 1,4,5,6,7,7-hexachlorobicyclo - [2.2.1] - 5 - heptene - 2,3 - dicarboxylic acid, 127 grams (1.0 mole) of melamine and 800 cc. of the diethyl ether of diethylene glycol along with 2 grams of an acid resin is treated in a manner similar to that set forth in the above examples. After heating at a temperature of about 200° C. for a period of about 6 hours and thereafter cooling the autoclave, the reaction mixture is recovered. The crystalline material which is formed during the reaction is separated by filtration and dissolved in dimethyl sulfoxide. Water is added to the mother liquor and the precipitate which is formed is treated with dimethyl sulfoxide. The two precipitates of dimethyl sulfoxide are combined and treated with water to recrystallize the desired product comprising 2-N - (1,4,5,6,7,7 - hexachlorobicyclo - [2.2.1] - 5 - heptene-2,3-dicarboximido)-4,6-diamino-s-triazine.

EXAMPLE IV

In this example 425 grams (1.0 mole) of 5,6,7,8,9,9-hexachloro - 1,2,3,4,4a,5,8,8a - octahydro -5,8 - methano-2,3-naphthalenedicarboxylic anhydride, 63.5 grams (0.5 mole) of melamine, 800 c. of dimethyl ether of diethylene glycol and 2 grams of an acid resin are placed in the glass liner of a rotating autoclave. The resulting mixture is heated at a temperature of about 225° C. for a period of about 6 hours. At the end of this time, the reactor and contents thereof are allowed to cool to room temperature. The crystalline material which is formed is separated from the mother liquor by filtration, the mother liquor is then treated with water to crystallize any product which may be present in said mother liquor. The two precipitates are combined and disolved in dimethyl formamide. Following this, water is added to the dimethyl formamide to recrystallize the desired product which comprises 2,4 - bis - [N - (5,6,7,8,9,9 - hexachloro - 1,2,3,4, 4a,5,8,8a - octahydro - 5,8 - methano - 2,3 - naphthalenedicarboximido)]-6-amino-s-triazine.

EXAMPLE V

In this example 425 grams (1.0 mole) of 5,6,7,8,9,9-hexachloro - 1,2,3,4,4a,5,8,8a - octahydro - 5,8 - methano-2,3 - naphthalenedicarboxylic anhydride, 180 grams (1.0 mole) of 2 - amino - 4,6 - di - (ethylamino) - s - triazine, 800 cc. of diethyl ether of diethylene glycol and 2 grams of an acid resin are treated in a manner similar to that set forth in the above examples. At the end of the reaction time, the reaction mixture is filtered, the mother liquor is treated with water to precipitate any additional product, the precipitates are combined, dissolved in dimethyl sulfoxide and recrystallized by the addition of water. The desired product comprising 2 - N - (5,6,7,8,9,9-hexachloro - 1,2,3,4,4a,5,8,8a - octahydro - 5,8, - methano-2,3 - naphthalenedicarboximido) - 4,6 - di - (ethylamino)-s-triazine is recovered.

EXAMPLE VI

A mixture of 346 grams (0.5 mole) of 5,6,7,8,9,9-hexabromo - 1,2,3,4a,5,8,8a - octahydro - 5,8 - methano-2,3 - naphthalenedicarboxylic anhydride, 63.5 grams (0.5 mole) of melamine, and 800 cc. of the diethyl ether of diethylene glycol is placed in the glass liner of a rotating autoclave and heated to a temperature of about 225° C. for a period of 6 hours. At the end of this time, the reaction mixture is recovered and treated in a manner similar to that hereinbefore set forth. The desired product comprising 2 - N - (5,6,7,8,9,9 - hexabromo - 1,2,3,4, 4a,5,8,8a - octahydro - 5,8 - methano - 2,3 - naphthalene-dicarboximido)-4,6-diamino-s-triazine is recovered.

EXAMPLE VII

In this example, 425 grams (1.0 mole) of 5,6,7,8,9,9-hexachloro - 1,2,3,4,4a,5,8,8a - octahydro - 5,8 - methano-2,3 - naphthalenedicarboxylic anhydride, 151 grams (1.0 mole) of 2 - amino - 4,6 - dichloro - s - triazine, 800 cc. of the dimethyl ether of diethylene glycol and 2 grams of an acid resin are treated by heating the mixture to a temperature of about 180° C. for a period of 6 hours, said reaction being effected in the glass liner of a rotating autoclave. At the end of this 6 hour period, heating is discontinued and the vessel and contents thereof are allowed to cool to room temperature. The solid crystalline material which is formed during the reaction time is separated from the mother liquor by filtration. The mother liquor is then treated with water and the crystalline material which forms is also separated by filtration. The two precipitates are combined and dissolved by the addition of dimethyl formamide. Recrystallization of the material is accomplished by treating the solution with water. Following this, the recrystallized material comprising 2 - N - (5,6,7,8,9,9 - hexachloro - 1,2,3,4,4a,5,8,8a-octahydro - 5,8 - methano - 2,3 - naphthalenedicarbox-imido)-4,6-dichloro-s-triazine is recovered.

EXAMPLE VIII

In this example 425 grams (1.0 mole) of 5,6,7,8,9,9-hexachloro-1,2,3,4,4a,5,8,8a-octahydro - 5,8 - methano-2,3-dicarboxylic anhydride were dissolved in 495 grams of the dimethyl ether of diethylene glycol along with 187 grams (1.0 mole) of 2,4-diamino-6-phenyl-s-triazine. The reaction was run under a nitrogen pressure of 150 atmospheres at 180° C. in a glass liner of a three-liter autoclave. At the end of the reaction time, which consumed six hours, the reaction mixture was recovered, cooled, with the resultant appearance of a crystalline material. The crystalline material was filtered from the liquid and digested with hot methyl alcohol. Recrystallization resulted in obtaining substantially white crystals of the product which comprised 2-N-(5,6,7,8,9,9-hexachloro-1,2,3,4,4a,5,8,8a-octahydro - 5,8 - methano-2,3-dicarboximido)-4-amino-6-phenyl - s - triazine. The crystals were analyzed for nitrogen content with the following results:

Calculated for $C_{22}H_{13}Cl_6N_5O_2$ (percent): N, 11.75. Found (percent): N, 11.14.

EXAMPLE IX

In this example 19 grams of 2 - N - (5,6,7,8,9,9-hexachloro - 1,2,3,4,4a,5,8,8a - octahydro - 5,8 - methano-2,3-dicarboximido) - 4,6 - diamino-s-triazine which was prepared according to Example I above was milled for five minutes with 81 grams of high molecular weight poly-propylene and 0.5 grams of a polyhydroxy polycyclic butane oxidation inhibitor to prevent any oxidation which may occur during the milling which was conducted at a temperature of 185° C. The milled sample was pressed into strips which contained a glass cloth in the center to prevent dripping. In addition, other strips were prepared from high molecular weight propylene which did not contain any of the imide compounds. The strips were then burned in the apparatus, similar to the one described by C. P. Fenimore and F. J. Martin in the November 1966 issue of Modern Plastics. The polypropylene, which contained the N-s-triazyl imide of the halo-substituted polyhydropolycyclicdicarboxylic acid, had an oxygen index (the lowest mole fraction of oxygen which is sufficient to maintain combustion) $n=0.192$. By contrast, the polypropylene which did not contain the imide had an oxygen index $n=0.180$. Furthermore, the time to burn one inch of the polypropylene which contained the fire retardant material prepared according to Example I was 165 seconds per inch. In contrast to this, the blank polypropylene strip burned one inch in 55 seconds. This, therefore, is a graphic illustration of the substantial flameproof properties exhibited by incorporating the imide into the polypropylene.

EXAMPLE X

A commercial plastic comprising ABS was milled for five minutes with an oxidation inhibitor as described in Example IX above to prevent oxidation during the milling. Strips, which were similar in nature to those described in Example IX above, were pressed and burned in a similar apparatus. The oxidation index of the blank-noninhibitor co-polymer was 0.182. A similar sample of ABS containing 30% by weight of 2-N-(5,6,7,8,9,9-hexachloro - 1,2,3,4,4a,5,8,8a-octahydro-5,8-methano - 2,3-dicarboximido)-4,6-diamino-s-triazine has an oxygen index in excess of 0.190.

I claim as my invention:

1. Imide of a halo-substituted polyhydropolycyclicdicarboxylic acid and an N-s-triazine, said acid having the formula

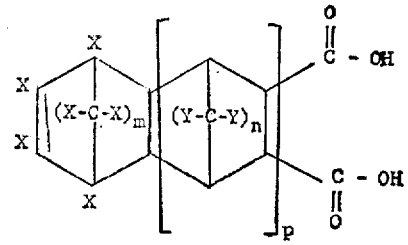

in which X is chlorine, bromine or hydrogen, at least two X's being chlorine or bromine; Y is chlorine, bromine or hydrogen; $m$ is 1 or 2; $n$ ranges from zero to 2; and $p$ is zero or 1; and said triazine having the formula

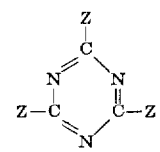

in which Z is selected from the group consisting of amino, chlorine, bromine, lower alkyl, $C_5$ or $C_6$ cycloalkyl, phenyl, lower alkenyl, phenyl-substituted lower alkyl, lower alkyl-substituted phenyl, lower alkoxy, phenoxy, halophenyl, and substituted amino radicals containing one of the aforementioned radicals defining Z, at least one Z being amino.

2. The compound of claim 1 being 2-N-(5,6,7,8,9,9-hexacholoro-1,2,3,4,4a,5,8,8a - octahydro - 5,8 - methano-2,3-naphthalenedicarboximido)-4,6-diamino-s-triazine.

3. The compound of claim 1 being 2-N-(5,6,7,8,9,9-hexachloro - 1,2,3,4,4a,5,8,8a - octahydro - 1,4,5,8 - dimethano - 2,3 - naphthalenedicarboximido) - 4,6 - diamino-s-triazine.

4. The compound of claim 1 being 2-N-(1,4,5,6,7,7-hexachlorobicyclo - [2.2.1] - 5 - heptene - 2,3 - dicarboximido)-4,6-diamino-s-triazine.

5. The compound of claim 1 being 2,4 - bis - [N-(5,6,7,8,9,9 - hexachloro - 1,2,3,4,4a,5,8,8a - octahydro-5,8 - methano - 2,3 - naphthalenedicarboximido)] - 6-amino-s-triazine.

6. The compound of claim 1 being 2-N-(5,6,7,8,9,9-hexachloro - 1,2,3,4,4a,5,8,8a - octahydro - 5,8 - methano - 2,3 - naphthalenedicarboximido) - 4,6 - di - (ethylamino)-s-triazine.

7. The compound of claim 1 being 2-N-(5,6,7,8,9,9-hexachloro - 1,2,3,4,4a,5,8,8a - octahydro - 5,8 - methano - 2,3 - naphthalenedicarboximido) - 4,6 - diamino-s-triazine.

8. The compound of claim 1 being 2-N-(5,6,7,8,9,9-hexabromo - 1,2,3,4,4a,5,8,8a - octahydro - 5,8 - methano - 2,3 - naphthalenedicarboximido) - 4,6 - dichloro-s-triazine.

References Cited
UNITED STATES PATENTS 3,219,666   11/1965   Norman _____ 260—249.6X HENRY R. JILES, Primary Examiner J. M. FORD, Assistant Examiner U.S. Cl. X.R.

117—136; 252—8.1; 260—249.5, 249.8, 249. 9, 45.8, 514, 546